United States Patent [19]

Vass

[11] Patent Number: 5,532,281

[45] Date of Patent: Jul. 2, 1996

[54] METHODS AND APPARATUS FOR PRODUCING A COMPOSITION MATERIAL AND PRODUCTS OF THE METHODS AND APPARATUS

[76] Inventor: Richard T. Vass, 1032 San Carlos Dr., Antioch, Calif. 94509

[21] Appl. No.: 529,280

[22] Filed: Sep. 15, 1995

[51] Int. Cl.$^6$ .............................. C08J 9/00; B01J 13/02; B32B 5/22

[52] U.S. Cl. .................. 521/76; 427/213.3; 427/213.32; 427/213.33; 427/213.36; 428/317.9; 428/402.24; 521/54; 521/65; 521/78; 521/79; 523/218; 523/219

[58] Field of Search ................................ 521/76, 65, 78, 521/79, 54; 427/213.3, 213.32, 213.33, 213.36; 428/317.9, 402.24

[56] References Cited

U.S. PATENT DOCUMENTS

4,590,218  5/1986  Vass .......................................... 521/50

Primary Examiner—Morton Foelak
Attorney, Agent, or Firm—Feix & Feix

[57] ABSTRACT

Methods and apparatus are disclosed for producing a composition material which embodies both physical and chemical properties of a physically expanded polymer and specific structural and/or chemical properties of solid particles fully encapsulated within membranes in the expanded polymer.

27 Claims, 2 Drawing Sheets

Fig_1

Fig-2

METHODS AND APPARATUS FOR PRODUCING A COMPOSITION MATERIAL AND PRODUCTS OF THE METHODS AND APPARATUS

BACKGROUND OF THE INVENTION

The present invention relates to methods and apparatus for producing a composition material which embodies both the physical and chemical properties of a physically expanded polymer and specific structural and/or chemical properties of solid particles material fully encapsulated within membranes in the expanded polymer.

This invention relates particularly to such methods and apparatus and resulting products wherein numerous variations are possible in characteristics of the resulting product.

My prior U.S. Pat. No. 4,590,218 issued May 20, 1986 and entitled "Method and Apparatus for Forming a Chemical Composition from Cross-Linking Components and Product of the Method" discloses methods and apparatus for varying the density of a chemical composition formed from two liquid components selected for cross-linking reaction with each other.

This U.S. Pat. No. 4,590,218 is incorporated by reference in this application.

In one embodiment disclosed in the U.S. Pat. No. 4,590,218 atomizing means are provided for spraying the product onto the application zone. In one form of this embodiment a sprayed product included abrasive particles for developing negative buoyancy in the resulting product. The abrasive particles were introduced into the pressurized stream of atomizing air used for spraying the product onto the application zone.

The abrasive was added to produce a negative buoyancy, with respect to water, so that the resulting foam material product would have a density greater than 62.4 pounds per cubic foot (the density of water) and could therefore be used as a liner for the bottom of a pond of water without possible problems of the liner floating upwardly from the bottom of the pond.

While this method of introducing abrasive particles into the pressurized air stream used for atomization for spraying applications did produce a uniform distribution of the abrasive in the spray applied polymer, the only purpose of adding the abrasive was to increase the density so as to provide a negative buoyancy. There was no concept in the U.S. Pat. No. 4,590,218 of producing new polymer/particle composition products to incorporate both the physical and chemical properties of the expanded polymer and specific structural and/or chemical properties of added solid particles fully encapsulated in membranes in the expanded polymer.

The method of introducing the abrasive particles into the pressurized atomizing air stream in the U.S. Pat. No. 4,590,218 also has certain limitations. The amount of abrasive, for example, that could be included in polymer in this way was limited, and the abrasive could only be satisfactorily included in certain polymers. The polymer must have a suitably strong structure; otherwise the cells would collapse. And the polymer must not be too fast curing as to prevent injection of the solid particles.

The primary intent of the present invention is to produce new products which are composition materials and which embody both the physical properties of a physically expanded polymer material and specific structural and/or chemical properties of added solid particles which are fully encapsulated within membranes of the expanded polymer material.

The present invention produces unique composition materials of this kind by taking advantage of the flow properties of a liquid, the incompressible properties of a solid, and the compressible properties of a gas.

The present invention takes advantage of these properties by intimately mixing a gas under pressure with a liquid component, allowing that liquid component and entrained pressurized gas to be released in an enclosing chamber and allowing the gas that is entrained in that liquid to expand and to cause the liquid polymer and entrained gas to fill up the available space of the enclosing chamber.

Then, by the addition of solid particles into the compressible gas entrained liquid while the liquid is still in a relaxed state, the method yields a new product offering both the physical and chemical properties of the resin produced from the liquid component material and the specific structural and/or chemical properties that are contributed by the solid particles (e.g., the chemical inertness afforded by solid sand fillers and/or chopped fiberglass, or the swelling properties contributed by bentonite clay, the cushioning properties contributed by rubber material, or high impact or load-bearing properties as contributed by aggregate or abrasive-containing materials).

A liquid material offering the flow properties allows these liquid and added solid materials to be deposited in areas by spray application or by pour.

Since the flow properties based upon the resin (polymer) versus the solid particle content can be varied, it is possible to provide a very tough, resilient, very chemically resistant, finished product—more so than can be obtained with the liquid component material by itself in any of these instances.

The products of the present invention can be provided with properties of either burn resistance or high impact resistance or dielectric or cushioning properties, and all of these products are held together in an appropriate resin binder.

The net effect in each case has been a new product more serviceable than either one of the polymer or filler components of the new product would be by themselves.

Two additional things stand out in the present invention. By filling the enclosing chamber with the gas entrained liquid, the particles are literally immersed into that liquid matrix, and each particle is uniformly coated.

The present invention has been able to achieve densities far greater than could be achieved by manual or mechanical mixing or by any other prior art mixing method that can be compared to the present invention.

In products produced by the present invention there has been no evidence of dry spots. Even the top particles that have been observed still have the evidence of the encapsulating coating on the particles.

An unexpected but very important attribute of the method of the present invention of blending the solid and liquid components is the fact that, as a compressible or yieldable matrix material is filling up the spaces of the enclosing chamber, even the finest of particles, down to 200 mesh particle size, have been uniformly encapsulated and incorporated in the polymer.

SUMMARY OF THE PRESENT INVENTION

The present invention provides a method and apparatus for producing a composition material which embodies both the physical and chemical properties of a physically expanded polymer material and specific structural and/or chemical properties of added solid particles fully encapsulated within membranes in the expanded polymer.

In the present invention a polymer material in an uncured, liquid form is conducted to a mixing chamber.

A pressurized gas is introduced and is intimately blended into the liquid polymer material in the mixing chamber.

The pressurized gas is chemically inert with respect to the liquid polymer material.

The blend of liquid polymer material and entrained pressurized gas is conducted to an enclosing chamber where the pressurized gas can expand the liquid polymer material and entrained gas to fill the enclosing chamber. The pressurized gas expands the liquid polymer material in the enclosing chamber so that the expanded liquid polymer and gas is compressible and can have solid particle material readily injected and encapsulated within spaces made available by the expansion of the liquid polymer material.

The expanded liquid polymer material and gas is allowed to take up the available volume of the enclosing chamber, and the liquid polymer is fully expanded within the enclosing chamber.

A flow stream of added solid particle material is conducted to the enclosing chamber. The particle material is introduced into the compressible, expanded liquid polymer and gas in the enclosing chamber in close conjunction with the physical expansion of the liquid polymer material and while the compressible liquid material and gas are in a physical condition to yield readily to the introduction of said solid particles into the spaces made available by the expansion of the liquid polymer material.

The particle material is selected to add particular structural and/or chemical properties to the composition material as finally produced.

The quantity of introduced added particle material is controlled, in any amount up to a limit determined by the amount of compressibility of the gas expanded liquid polymer material within the enclosing chamber, to cause all of the added particle material to be intimately and evenly distributed within the polymer material while the polymer material is expanded in a relaxed state in the enclosing chamber. As a result, substantially every particle of the added particle material is fully encapsulated by a membrane of the polymer material as the mixture of the expanded polymer material, gas and added particle material flows through and out of the enclosing chamber. There are no dry spots of uncoated particles.

The mixture is conveyed in a relaxed, fluid, flowable state from the outlet of the enclosing chamber to a zone of application.

The mixture may be poured or sprayed at the zone of application.

Curing of the polymer material and the increased viscosity at the zone of application holds the added particle material substantially uniformly distributed within and embedded within a matrix of the polymer material at the zone of application whereby said matrix enables the composition material substantially uniformly to incorporate particular structural and/or chemical properties of the added particle material.

Methods and apparatus which incorporate the features described above and which are effective to function as described above comprise additional, specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF THE PREFERRED EMBODIMENTS

Figure 1:
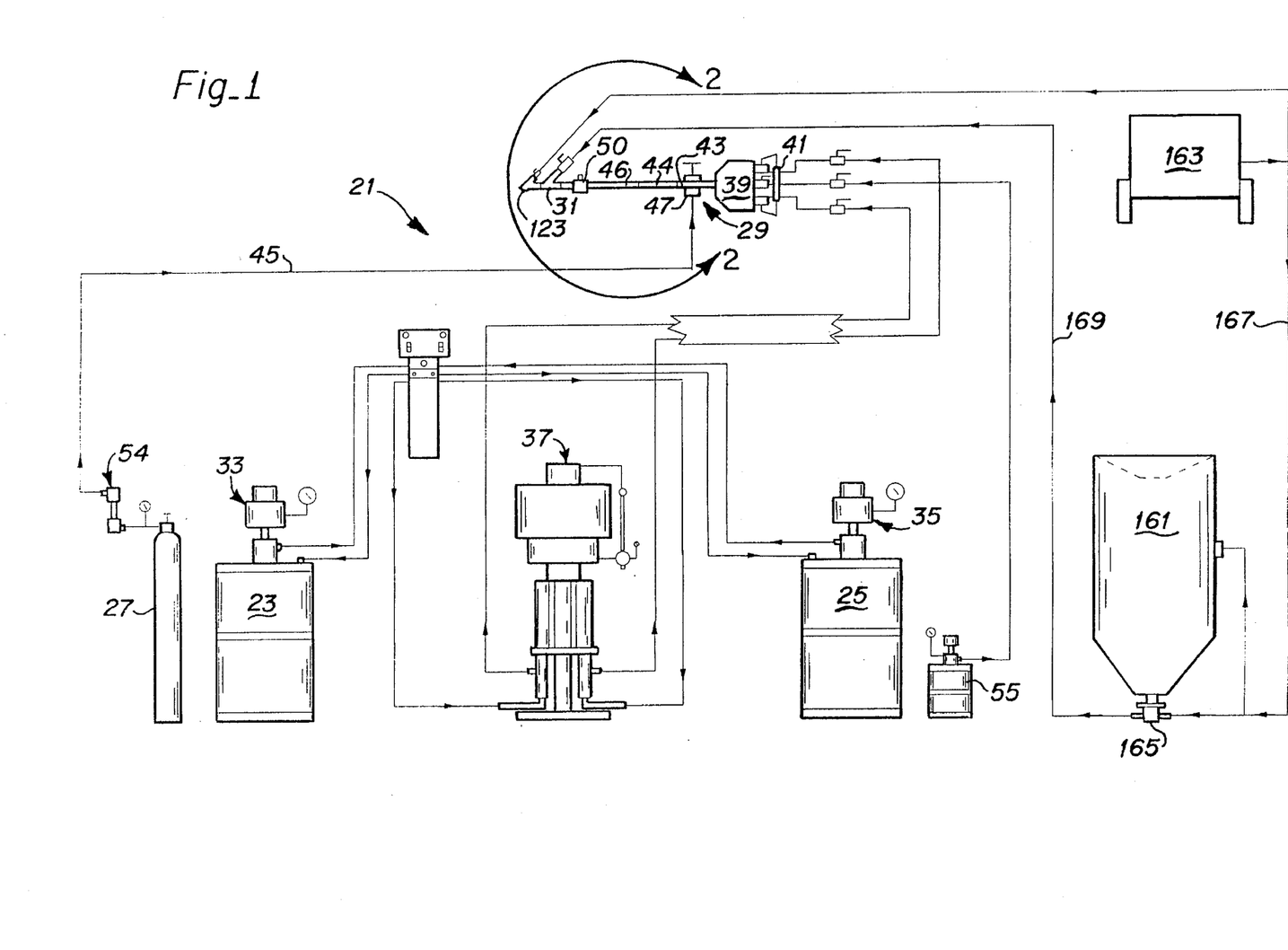
FIG. 1 is a schematic representation of a system constructed in accordance with one embodiment of the present invention for producing a composition material which embodies both the physical and chemical properties of a physically expanded polymer material and the specific structural and/or chemical properties of added solid particles full encapsulated in membranes in the expanded polymer.

FIG. 1 shows a system 21 constructed in accordance with one embodiment of the present invention for producing a composition material which embodies both the physical and chemical properties of a physically expanded polymer material and specific structural and/or chemical properties of added solid particles.

The system 21 shown in FIG. 1 incorporates many of the elements of the corresponding system 21 shown in U.S. Pat. No. 4,590,218 issued May 20, 1986. Elements in the system 21 of FIG. 1 of this application which correspond to elements in the system 21 of the U.S. Pat. No. 4,590,218 are indicated by corresponding reference numerals.

The U.S. Pat. No. 4,590,218 issued May 20, 1986 and entitled "Methods and Apparatus for Forming a Chemical Composition from Cross-Linking Components and Product of the Method" is incorporated by reference in this application.

The system 21 shown in FIG. 1 includes a container 23 for holding a supply of a first component (which component is referred to in the examples as the A component), a container 25 for holding a supply of a second component (which component is referred to in the examples as the B component), a source 27 of compressed gas, and a mixing chamber, indicated by the general reference numeral 29.

A pressurized inert gas is mixed and blended with the polymer material in the mixing chamber 29, as described in more detail below.

The two containers 23 and 25 are replaced by a single container for non crosslinking polymers, such as, for example, a polymer emulsion compound having water in the emulsion as disclosed below in Example 9.

As disclosed in more detail below, a proportioning pump 37 and a mixer manifold 39 are also not needed for a polymer emulsion compound having water in the emulsion.

Figure 2:
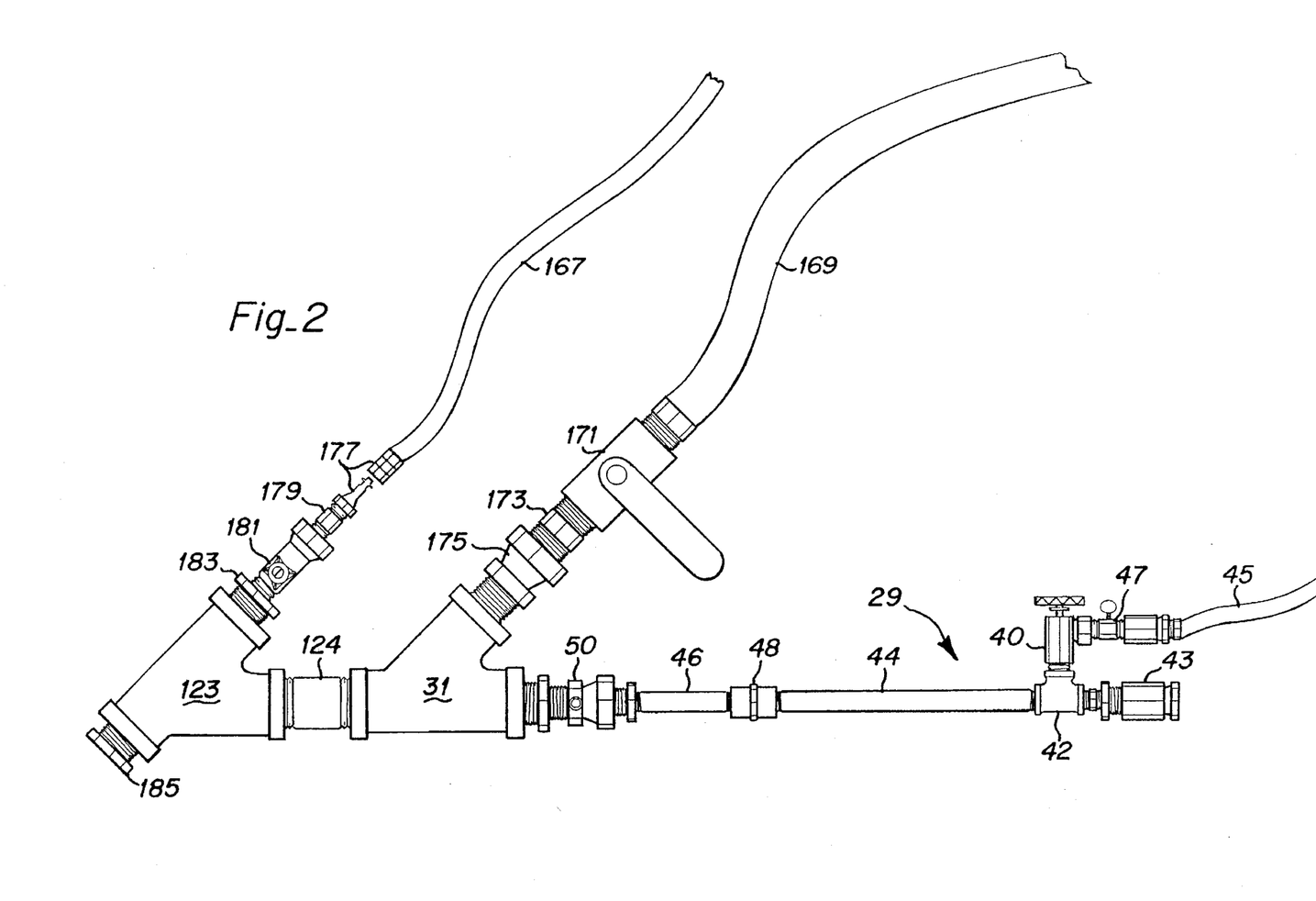
FIG. 2 is an enlarged side elevation view of the portion of the system shown encircled by the arrows 2—2 in FIG. 1.

The system 21 includes an enclosing chamber 31. In a specific embodiment of the present invention the enclosing chamber is a ¾ inch Y fitting, as best illustrated in FIG. 2.

As will be described in more detail below, the product from the outlet from the enclosing chamber 31 may be either poured at the application site or sprayed by means of an atomizing spray nozzle fitting 123. The atomizing spray nozzle 123 is (as best shown in FIG. 2) a second Y fitting which is connected to the outlet of the enclosing chamber 31 by a connecting nipple 124.

As illustrated in FIG. 1, the container 23 has a material transfer pump 33, and the container 25 has a material transfer pump 35.

The transfer pumps 33 and 35 serve to maintain a constant supply of the respective A and B components to a proportioning pump 37.

The proportioning pump 37 in turn supplies the A and B components in metered proportions to a mixer manifold 39 which forms a part of the multi-component mixer 29 referred to above.

The mixer manifold 39 is a conventional, commercially available, valving system. It involves ball valves and check valves to allow the A and B components to come together and also contains a separate valve to allow solvent from a source 55 to be used to purge the system for cleanup.

The mixer manifold 39 includes a handle 41 for on/off control of the material supply through the mixture manifold 39.

The mixer 29 also includes a static mixer 43. See FIG. 2.

As shown in FIG. 2, the mixer 29 also includes a polymer mixer 44 and an inert gas mixer 46.

The polymer mixer 44 is formed with internal helical vanes for intimately mixing the A and B components of the liquid polymer.

The polymer mixer 44 is not used with pre-polymerized materials, such as, for example, an asphalt emulsion, a latex emulsion, or an alkyd enamel.

The inert gas mixer 46 is, in the FIG. 2 embodiment, coupled to the polymer mixer 44 by a coupler 48; and the inert gas mixer 46 includes an internal element that intimately blends the gas with the polymer. In a specific embodiment the inert gas mixer includes an internal, removable, metal brush formed with a spiral configuration and having a plurality of radially extending brass wire brush elements within the spiral configuration for causing the inert gas to blend very intimately with the liquid polymer material.

In a particular embodiment of the present invention the internal, spiral-shaped wire brush is approximately ¼ inch in diameter and is a brush of the kind used for cleaning rifle barrels.

A material regulator valve 50 is connected to the outlet of the inert gas mixture 46 by a bushing as shown in FIG. 2. The flow of the blended, pressurized, inert gas and liquid polymer from the material regulator valve 50 passes into the inlet end of the enclosing chamber 31.

As will be described in more detail below, the enclosing chamber 31 allows the pressurized gas that is entrained in (and that is very intimately blended with) the liquid polymer in the inert gas mixer 46 to expand as it enters the enclosing chamber 31. This permits the blended liquid polymer and entrained gas to expand and to fill up the available space of the enclosing chamber 31.

The pressurized inert gas is introduced (through a line 45, a metering valve 47, a shutoff valve 40, and a Tee fitting 42) into the flow of the liquid polymer flowing from the static mixer 43 and into the polymer mixer 44.

In a preferred embodiment of the present invention, the inert gas is carbon dioxide and the gas line 45 is a line having an internal diameter of 3/32 inch. Pressures of the carbon dioxide in the gas line 45 are typically about 900 psi; and the flow rate of the carbon dioxide gas through the gas metering valve 47 is typically at the rate of 0.05% by volume of the liquid polymer flowing through the static mixer 43.

The enclosing chamber 31 is an open ended Y fitting which does not contain any valving. This enclosing chamber 31 does not have a nozzle or other structure at its outlet which could have the effect of producing back pressure or which could have the effect of restraining flow of the material through the enclosing chamber 31.

The enclosing chamber 31 has sufficient volume and length to permit the expansion of the blended liquid polymer and entrained gas material to achieve stable cell formation within the enclosing chamber 31.

As the mixture of the liquid polymer and entrained, pressurized inert gas passes through the material regulator valve 50 and into the inlet of the enclosing chamber 31, the enclosing chamber 31 permits the pressurized gas to physically expand the liquid polymer material to fill the enclosing chamber 31 and to take up the available space of the enclosing chamber.

The material regulator valve 50 restricts the flow sufficiently to cause the material entering the enclosing chamber 31 to undergo a substantial pressure drop.

This allows the liquid polymer material to be fully expanded within the enclosing chamber 31 so that the physically expanded liquid polymer material is in a relaxed state and is compressible.

In accordance with the present invention, a solid particle material (referred to in the examples below as the C component) is introduced into the compressible, expanded liquid polymer and gas in the enclosing chamber 31 in close conjunction with the physical expansion of the liquid polymer material and while the compressible liquid polymer material and gas are in a physical condition to yield readily to the introduction of the solid particle material.

The solid particle material is selected to add particular structural and/or chemical properties to the composition material produced by the system 21 (as will be described in more detail below in the examples).

As shown in FIG. 1, a container 161 serves as a source for the solid particle material.

An air compressor 163 provides pressurized air through a ¼ inch air line 167. The pressure of the air in the line 167 is subsequently regulated (as will be described below) (1) for use in association with the introduction of the solid particle material into the upper Y fitting inlet (as viewed in FIG. 2) of the enclosing chamber 31 and (2) for use in atomization for spray applications.

The source 161 may supply the solid particle material by gravity feed to an air flow mixer 165 in those instances in which the particle material are relatively large, course particles, such as, for example, sand filler, chopped fiberglass and rubber particles.

In those instances in which those particles are very fine, light particles, such as, for example, bentonite clay having a particle size smaller than 100 mesh, the source 161 may include a fluidizing bed for maintaining the fine, light particles in an air suspension prior to the delivery to the air flow mixer 165.

As illustrated in FIG. 1, the air compressor 163 supplies compressed air through a line 167 to the outlet fitting 165 for entraining the solid particle materials in an air stream within the mixer 165.

In a specific embodiment a ½ inch internal diameter particle filler supply hose 169 then conducts the particles, suspended in a pressurized air stream, to the particle matter inlet of the Y fitting enclosing chamber 31 (the upwardly extending, 45° inclined Y inlet as viewed in FIG. 2).

As illustrated in FIG. 2, a pressure and flow regulator ball valve 171, a nipple 173, and a swivel 175 are interposed between the end of the hose 169 and the upper, particle inlet opening of the enclosing chamber 31.

As noted above, the solid particle material is introduced (in a quantity controlled by the pressure and flow regulator ball valve 171 ) into the compressible, expanded liquid polymer and gas in the enclosing chamber 31 in close conjunction with the physical expansion of the liquid polymer material and while the compressible liquid polymer material and gas are in a physical condition to yield readily to the introduction to the solid particle material.

By blending the solid particles with the compressible liquid polymer material and entrained gas in this way, while the compressible or yieldable matrix material filing up the space of the enclosing chamber 31, even the finest of particles, down to 200 mesh particle size, have been uniformly encapsulated and incorporated into the polymer.

The remarkably complete and uniform encapsulation of each particle occurs with finely divided particles, coarser materials in 30 mesh or an ⅛ inch size, and chopped fiberglass materials.

Upon microscopic examination, the degree of encapsulation—the lack of any dry areas—of each and every particle can be seen, even at as high a load density as can be obtained by the present invention.

This can be seen by looking at Enclosures 3–7 of the Appendix and discussed in more detail below in the text of the SUMMARY OF FEATURES OF THIS INVENTION.

The present invention permits maximum load densities to be achieved, because the quantity of introduced added particle material can be controlled in any amount up to a limit determined by the amount of compressibility of the gas expanded liquid polymer material within the enclosing chamber.

The introduced particle material (the C component) can be selected to provide specific structural and or chemical properties of the solid particles to the composition material produced upon curing of the polymer material at the zone of application.

The composition material, in fluid, flowable form exits the expanding chamber 31 and may be either poured or sprayed at the zone of application.

In the specific embodiment shown in FIG. 2, a second Y fitting 123 is connected to the outlet of the expanding chamber 31 by a ¾ of an inch nipple 124 for spray application for the composition product. As illustrated in FIG. 2, the ¼ inch air line 167 is connected to the upper inlet of the Y fitting 123 by a quick coupler 177, a ¼ inch nipple 179, a ¼ inch pressure and flow regulator valve 181 and a ¾ inch by ¼ inch bushing 183. The outlet end of the atomizing Y fitting 123 has a ¾ inch by ¼ inch coned bushing 185.

In operation of the atomizing Y fitting 123, the incoming air pressure and air flow are regulated by the valve 181 so as to product the desired amount of atomization without producing back pressure through the nipple 124 into the expanding chamber 31. The cone bushing 155 is removable and replaceable to provide different size nozzle orifices for specific applications.

The methods and apparatus for producing a composition material, in accordance with the preceding description, are illustrated through the following examples. These examples, while demonstrating preferred embodiments of the apparatus, method and products of the invention, are not to be considered a limitation thereon; it being understood that many variations and modifications, for example, in the apparatus components method parameters and material constituents, when employed by those skilled in the art, may be practiced without departing from the spirit and scope of the present invention as defined by the claims.

EXAMPLE 1

This example is described with reference to FIGS. 1 and 2, described above, and components A, B and C are identified as follows:

The A component is one of the chemically reactive components in this chemically cross linking embodiment; and the B Component is the other chemically reactive component which is combined with the A Component to form a polymer of specific properties.

It should be noted, as will be illustrated with reference to Example 9 below, that the present invention is also applicable to pre-polymerized compounds, such as, solvent diluted polymers or polymer emulsifiers. Specific examples of these two categories are latex emulsions, asphalt emulsions, and alkyd enamels, which are not cross-linking but which instead are polymers having water in the emulsion or organic solvents.

Specific examples of these two emulsions are latex emulsions, asphalt emulsions, and alkyd enamels, which are not cross-linking but which instead are polymers having water in the emulsion or organic solvents.

The C component are solid particles which are injected into the chemically reactive A and B components to form a new polymer of specific physical properties unique to that addition of the solid particle. The C component may increase the weight of the new polymer. It may increase hardness. It may affect impact properties. It certainly would affect density, and it may affect the burnability of the product.

Each one of these properties are determined by the A and B components that are chemically reacting and the C component that is added to it.

The A and B components, as used in Example 1 and briefly summarized above, are fully described in Table 5 on page 6 of a brochure published by Mobay Chemical company and entitled "*Thick Section Coatings*" (C5-3B), (June, 1981). This brochure is incorporated by reference in the application. In Table 5 of the above publication, a system including components similar to the A and B components referred to above is identified by the trade designation NB#277453.

In this example, components A and B were combined in a 1.6:1 ratio on a weight basis or about two to one on a volume basis. Both components A and B were initially heated, in their separate containers 23 and 25, to within the range of 90 to 130 degrees F., specifically about 130 degrees F., and combined in equipment illustrated in FIG. 1 with an output rate of 1 gallon per minute for the proportioning pump 37. The combined components A and B were then introduced into the static mixing chamber 43 as described above and shown in FIGS. 1 and 2.

At the same time, a carbon dioxide gas was introduced into the static mixing tube through the needle valve 47 at the rate of about 0.05 percent by volume.

Components A and B were intimately mixed with each other and with the carbon dioxide gas within the polymer mixer 44 and within the inert gas mixer 46.

As the mixture of the components A and B and the carbon dioxide gas left the inert gas mixer 46, this mixture passes through the material regulator valve 50 and into the enclosing chamber 31 where the solid particles are introduced.

In this example, the carbon dioxide line 45 had an internal diameter of 3/32 inch, the lines for the components A and B had internal diameters of ½ inch, the polymer mixer 44 and the inert gas mixer 46 each have internal diameters slightly larger than ¼ inch (0.364 inch). The enclosing chamber 31 is a ¾ inch Y fitting and has an internal diameter of 0.824 inch. It should be noted, however, that the Y fitting construction of the enclosing chamber 31 itself affords some additional internal volume within the Y fitting.

The length of the Y fitting is approximately 4 inches and the inlet fitting for the introduction of particles is located at a 45° angle and closely adjacent the location at which the entrained gas is permitted to expand at the inlet to the enclosing chamber 31.

The key parameter in this regard is to adjust the flow of expanded material entering the enclosing chamber 31 where the solid particles are introduced, and it is always sized so that you have an enclosing chamber full of expanded matter to accept the solid particles. The energy of the inert gas naturally fills the enclosing chamber 31, as a gas would, expanding the resin components for the component C.

The diameter of the conduit line 169 transporting the component C filler material is ½ inch internal diameter.

In this example the component C is a mixture of dry sand and chopped fiberglass.

The Y fitting 123 for atomizing the product is ¾ inch (like the ¾ inch Y for the expanding chamber 31 described above).

A ¼ inch air line 167 supplied air for atomizing under a pressure which can vary anywhere from 20 pounds to 50 pounds, as based on the flow rate of the material coming into the atomizing Y fitting 123. That atomizing air pressure is generally adjusted, like in spray painting, to get the desired spray pattern.

A ¼ inch diameter round nozzle 185 is positioned at the outlet of the atomizer Y fitting 123 for spraying the atomized material.

The flow pressures for each of the components A and B was approximately 700 psi for each of the components. Components A and B were intimately mixed with each other within the polymer mixer 44, and the carbon dioxide gas was further intimately mixed with these mixed components A and B within the inert gas mixer 46. The flow rate of the mixed liquid polymer and gas was regulated by the mixed material fluid regulator valve 50.

The material regulator valve 50 restricts the flow sufficiently to cause the material entering the enclosing chamber to undergo a substantial pressure drop.

The material regulator valve 50 restricts the flow sufficiently to cause the material entering the enclosing chamber to undergo a substantial pressure drop.

The material produced in this sample resulted in a product having a measured density of approximately 95 to 97 pounds per cubic foot. In this specific case, the material was sprayed to a dimension of a half inch, while in some other instances the dimensions were increased as high as 1 inch in thickness.

This particular material has a high filler content of sand and chopped fiberglass, and the produced product offered high compressive load-bearing properties, good impact properties (again because of the high sand load). The produced product is also resistant to burning (because of the high ratio of nonflammable solid particles); and yet the product (because of the particular polymer used) offered good flexibility as an elastomer.

The polymer contributed significant flexibility as an elastomer and also contributed crack resistance (as compared to something like concrete which would certainly crack in bending and which would therefore not be able to be flexed).

EXAMPLE 2

The steps of Example 1 were repeated except that the example was applied at the same solid particle rate only at a ¼ inch thickness yielding even greater flexibility plus all the other properties which were observed in the thick film sample. Probably the most obvious benefit or application for this thinner film example is where a vertical or overhead application is possible. The material was able to be applied vertically and overhead in thicknesses of up to 3/8 inch thick by demonstration and would resist subsequent cracking on a rigid concrete wall.

EXAMPLE 3

The steps of Example 1 were again repeated except that in this example 3, the solid particle content was reduced to a more resin-rich film which resulted in a thicker film offering more flexibility with some sacrifice in the surface roughness which surface roughness might be beneficial for non-skid, non-slip purposes and the burn resistance properties. The Example 3 product offers a cosmetically smoother surface and more flexibility and/or solvent-type chemical resistance than the Example 1 product; but the structural and chemical properties of the Example 3 product would not change substantially because of the reduction of the solid particles; cosmetically, it was a smoother surface.

It should be noted that by reducing the amount of solid particles relative to the resin, one can change the flow properties of the material for a self-leveling feature on a severely degraded surface. Also, in all the applications, it would just require a thicker layer to achieve this self-leveling property as you increase the particle density.

EXAMPLE 4

The steps of Example 1 were again repeated. In this case, the substrate included an expanded metal which was literally tack welded to a steel substrate. The expanded metal was 1/16 inch thick that would easily flex. The ¼ inch thick steel substrate, without the expanded metal, was a difficult to coat surface because the surface was contaminated with oil. By welding the expanded metal to that contaminated steel surface and then encapsulating the expanded metal, the filled system provided a durable, flexible flooring system.

EXAMPLE 5

The same C component material was used as in Example 1, but a proprietary flexible epoxy material was used as the A and B components. The proprietary flexible epoxy material offered a different set of chemical resistant properties and provided a tough impact-resistant finished product with the properties of the multifunctional epoxy NOVOLAC type resins.

In this particular example the epoxy material was CORCHEM 205 chemical resistant elastomer as supplied by the Corchem Corporation of Huntington Beach, Calif. This particular CORCHEM 205 chemical resistant elastomer was mixed in a 4 to 1 ratio using the same equipment with different cylinders for proportioning. It was a solventless, 100% solids multi-component resin material to which the component C solid particles were injected as they were in the previous example.

A specification sheet giving data regarding this particular CORCHEM 205 chemical resistant elastomer is included as Enclosure 1 in the Appendix to this application. This specification sheet is incorporated by reference in this application.

EXAMPLE 6

The steps of Example 1 were again repeated with the exception that the resin material used was a product called ENDURA-FLEX® 1990, a product of Global Eco-Technologies. This resin material is known for its chemical resistance in and around waste treatment, concrete digester, cache basins, manholes and such things as that. A bentonite clay material was used as the solid particle in a 30 mesh particle size, and the Example 6 product offered waterproofing properties that would be beneficial on a roof or a subgrade concrete structure insofar that one can puncture that material; and the bentonite clay filled product, having the clay swelling properties held in the elastomeric properties of the ENDURA-FLEX® 1990, holds that clay in tension. The resulting benefit of it is that the clay swells and heals or self-seals in the presence of a puncture. Some of these punctures were repeated to a point of literally tearing the material and the product still maintained a seal against water migration.

A specification sheet giving information on the proprietary ENDURA-FLEX® 1990 material is set out in Enclosure 2 which is included as an Appendix to this application. The specification sheet is incorporated by reference in this application.

It should be noted that other coarser mesh clay, reported as a 17 mesh (a far more coarse material that almost has the appearance of an aggregate) was applied in thicknesses as thick as a quarter of an inch; whereas the earlier 30 mesh had been applied in thicknesses more in the neighborhood of 30 to 60 mils in thickness. This coarser mesh allowed for thicker application (as thick as a quarter of an inch) and might be used in a reservoir type application.

The traditional materials using clay are typically bound up with fabric. On a slope or vertical surface these traditional fabric bound clay materials therefore would slump and are not effective for use.

In this Example 6 product, the bentonite clay filler particles are held in tension in a polymer film, and these coarse mesh clay materials in substantial thicknesses can be applied both on a slope, on a vertical surface, or even overhead if necessary.

EXAMPLE 7

The steps of example 1 were again repeated with the exception that the polymer material was similar to the coal tar extended chemically cross-linking polyurethane such as was described in U.S. Pat. No. 4,590,218 in column 11, Example 5.

This two component coal tar prepolymer is fully described in Table 7 as "SOLVENT-FREE COAL-TAR-MODIFIED MAINTENANCE COATING", "FORMULATION MTS-6" of the June, 1981 publication by Mobay Chemical company entitled *"Thick Section Coatings"* (C5-3B). This publication is incorporated by reference in this application.

In this case that particular product had shown good resistance in hydrocarbon, petroleum-type uses for gasoline resistance.

In one case the same component C was used as was used in previous Examples 1 and 2. This component C included a blend of sand fillers and fiberglass to yield a product that offers the chemical resistance in hydrocarbon exposure, plus the physical abuse properties found in other products for impact and crack resistance, such as, for example, forklift traffic areas for drum storage where it takes lots of exposure to heavy items and skidding of drums and possible spills of hydrocarbons.

EXAMPLE 8

The steps of Example 1 and 7 were repeated except that the C component of Example 7 was changed. A 30 mesh sand (instead of the chopped fiberglass and sand filler of Example 7) was used as the C component to provide a smoother surface and yet still to offer high load-bearing properties.

EXAMPLE 9

In this example a polymer emulsion compound having water in the emulsion was used. This compound is considered as one of the lower property polymers in the industry today. It is typically used as pavement sealers; and, in this case, the use of the plural component equipment or any of the heating as used with the chemically cross-linking components was not required. In this case the polymer mixers were not required; however, the gas mixer is required and is used to intimately blend the $CO_2$ gas with the asphalt emulsion as it is pumped. The pressures and the flow rates for the polymer emulsion compound are the same as in Example 1. Pressures of 700 or 750 psi were used for the flow rate for the asphalt emulsion, and a 900 psi flow rate pressure was used for the $CO_2$ gas. Similar amounts of gas are used, and the flow regulator valve 50 is still used at the end of the gas mixer 46 to control the flow before the polymer emulsion with entrained gas enters the enclosing chamber 31, to allow this asphalt emulsion material to expand within the chamber 31 so as to fill the available space.

At that point the component C which includes the chopped fiberglass was added.

In another example, a component C was used without the chopped fiberglass.

But, in each case, the component C included the mixture of sand.

By using the method of the present invention the Example 9 product can be applied in thickness of up to ¼ inch thick, whereas the Example 9 polymer emulsion compound used by itself, or with just fillers put inside by prior art mechanical mixing, would normally be applied only maybe 100 mils or less, and there would always be shrinkage that would show the cracks.

The Example 9 product fills and bridges cracks in an underlying substrate and provides a uniformly appearing top surface that offers higher load-bearing properties and a lot higher abrasion properties for highway traffic than prior art coatings made from this polymer emulsion compound.

While the Example 9 polymer does not offer the chemical resistances of the higher property polymers, the product of Example 9 certainly made a far more serviceable traffic surface than products made using the traditional asphalt emulsion-type materials and traditional methods of applying such traditional materials.

One application for the Example 9 product is highway resurfacing where, typically, city streets become degraded from erosion of the asphalt and break up of the existing asphalt and where a typical resurfacing application might be 1½ inches to 2 inches of asphalt on city streets. Traditional resurfacing methods also generally require that the existing asphalt be scarified and removed from that surface to maintain the curb and gutter height necessary to maintain drainage on the city streets.

A product such as Example 9 can be applied in the thinner film of a ¼ inch without having to remove the existing pavement and the associated cost of disposing and removing the existing asphalt.

The Example 9 product provides what would appear to be a very serviceable traffic surface.

EXAMPLE 10

In this example, the steps of example 1 were repeated except that the C component or solid component, is ground rubber.

This product offers benefits for cushioned areas, playground areas, running tracks, and nonskid uses.

Traditional products for such applications are currently being done by hand with chemically crosslinking materials such as the Example 10 materials, but problems with dry spots in the rubber, resin mixture are generally found in such traditional products.

The Example 10 product allowed the component C to be uniformly dispersed in the resin mixture, with each particle entirely coated, and enabled surfaces as thick as an inch and a half to be built up.

A lot of public access requirements today, especially where disabled people access is involved, are requiring that, in lieu of sand at a playground, a cushioned material must be used.

EXAMPLE 11

In this example, the steps of Example 1 were repeated with the exception that the polymer material was the two component coal tar prepolymer referred to in Example 7 of this application. The method was employed for forming a bed for a track rail particularly suited for use with light transit vehicles and the like. The method was employed for forming a bed for a track rail like the Example 12 of U.S. Pat. No. 4,590,218, but the composite material product of the present invention has several advantageous properties as compared to the variable density polymer product described in Example 12 and illustrated in FIG. 4 of U.S. Pat. No. 4,590,218. The composite material product of the present invention offers higher load-bearing properties, because the earlier Example 12 product of the U.S. Pat. No. 4,590,218 provided solid material only, without the benefit of the solid particles added to it to encapsulate and to support the base of the rail. This Example 11 product of the present invention also, at the top of the rail (where traffic would come in contact with the polymer of the previous U.S. Pat. No. 4,590,218 product ) now incorporates the nonskid surface for traffic control.

It should be noted also that in the center of the rail area (which is not considered to be a high load-bearing area, but which is an area important for stray current or high dielectric properties) the product of the present invention can now incorporate solid particles, such as ground rubber, which would have high dielectric properties and which also offer the advantage of sound deadening and vibration dampening properties. So, all in all, using the methods and products of the present invention, one can have a lower cost product and yet have a product of higher physical properties than was available in the earlier U.S. Pat. No. 4,590,218.

SUMMARY OF THE FEATURES OF THIS INVENTION

In summary, the present invention provides the primary benefit of taking advantage of the flow properties of a liquid, the incompressible properties of a solid, and the compressible properties of a gas.

The present invention takes advantage of these properties by intimately mixing the gas under pressure with the liquid component, allowing that liquid component and entrained pressurized gas to be released in the enclosing chamber and allowing the gas that is entrained in that liquid to expand and to fill up the available space of the enclosing chamber and then, by the addition of the solid particles into that compressible gas-entrained liquid, yielding a new product offering both the physical properties of the resin produced from the liquid component material and the physical properties that would be beneficial from the solid particles (e.g., the chemical inertness afforded by a solid particle, or the swelling properties talked about in the bentonite clay, or the cushioning properties that might be found in a rubber material or the high impact and load bearing properties as are found with an aggregate or abrasive containing material).

A liquid material offering the flow properties allows these liquid and added solid materials to be deposited in areas by spray application or pour.

The spray application provides a uniform thickness. Many spray applications are found because of the efficient use of the materials in a spray form.

Since the flow properties based upon the resin versus the solid particle content can be varied, it is possible to provide a very tough, resilient, very chemical-resistant, finished product—more so than can be obtained with the liquid component material by itself in any of these instances.

The products of the present invention can be provided with properties of either burn resistance or high impact resistance or dielectric or cushioning properties, and all held together in an appropriate resin binder.

In some cases these products can be very low cost materials that have been enhanced by the solid particles; and, in some cases, the products can be very technologically advanced materials that are still further improved but lowered in cost by the addition of the filler type materials.

The net effect in each case has been something more serviceable than either one of the polymer or filler components of the products would be by themselves.

Two additional things stand out. By filling this enclosing chamber with this gas entrained liquid, the particles are literally immersed into that liquid matrix, and each particle is uniformly coated.

The present invention has been able to achieve densities far greater than could be achieved by hand mixing or any other prior art mixing methods that can be compared to the present invention. The present invention also provides the benefits of controlled flow and thickness. The present invention permits the application of sand filled materials of consistencies of concrete and asphalt at thicknesses of less than ½ inch.

In products produced by the present invention there has been no evidence of dry spots. Even the top particles that have been observed still have the evidence of the encapsulating coating on the particles. See, for example, Enclosures 3, 4, 5, 6, and 7 which are photographs (at approximately 50 times magnification and approximately 6 inch distance from the surface photographed) of the Example 1 product, the Example 5 product, the Example 9 product, the component C of Example 1 as supplied uncoated from the source 161, and a cross section through the Example 1 product.

In Enclosure 4 the top membrane was scraped off (by the tip of the needle probe shown in the photograph) revealing the underlying solid particle aggregate.

Enclosure 7 shows solid particle materials, aggregate particle material voids and entrained gas cells in the polymer between the solid particle materials.

From the standpoint of mixing these materials and using some of the fast setting materials (that one would not have sufficient time to mix together and to add a solid filler using prior art processes), the present invention has been able (in process as the materials were flowing) to create or to generate densities of materials that approach concrete in pounds per cubic foot density, yet achieve compressive strengths in three to five days which would require 28 days for a concrete, and still achieve (in the present invention) a flexible product, depending upon the polymer used.

It seems that the most apparent and most obvious attribute of this method of blending the solid and liquid components is the fact that, as a compressible or yieldable matrix material is filling up the space of this enclosing chamber, even the finest of particles, down to 200 mesh particle size, have been uniformly encapsulated and incorporated in the polymer.

The remarkable complete and uniform encapsulation of each particle occurs with finely divided particles, coarser materials in 30 mesh or an eighth of an inch, and fiber materials.

Upon microscopic examination, the degree of encapsulation—the lack of any dry areas—of each and every particle can be seen, even at as high a load density as can be obtained by the present invention.

It is really hard to believe that such a degree of encapsulation (as shown in microscopic examination) is possible.

It is thought that such complete encapsulation is only possible because the present invention creates an immersable situation for each one of these particles to be literally immersed in the liquid. And the gas makes that possible. The gas provides the room for the injection of the solid particles, be they fibers or fillers and whether they be coarse particles or very fine pigment size particles.

Magnification shows each particle coated. There is no evidence for a chance of migration of moisture or evidence of a dry substance in cross sections that have been cut out. There is no spalling of dry particles. Each particle seems to be intimately in contact with and adhered by the liquid resin component. Each particle appears to be covered.

In the chemically crosslinking materials, there are also cells created that do not have particles in them. These cells add to the flexibility properties of the product because those cells will yield.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method of producing a composition material which embodies both the physical and chemical properties of a physically expanded polymer material and specific structural and/or chemical properties of added solid particles fully encapsulated in membranes in the expanded polymer, said method comprising, conducting a polymer material in an uncured, liquid form to a mixing chamber, introducing and intimately blending a pressurized gas into the liquid polymer material in the mixing chamber, said pressurized gas being chemically inert with respect to the liquid polymer material, conducting the blend of liquid polymer material and entrained pressurized gas to an enclosing chamber wherein the pressurized gas can expand the liquid polymer material to fill the enclosing chamber, expanding the liquid polymer by the pressurized gas in the enclosing chamber so that the expanded liquid polymer and gas is compressible and can have solid particle material readily injected and encapsulated within spaces made available by the expansion of the liquid polymer material, allowing the expanded polymer and gas to take up the available volume of the enclosing chamber, allowing the polymer to be fully expanded within the enclosing chamber, conducting a flow stream of added solid particle material to the enclosing chamber, introducing the particle material into the compressible, expanded liquid polymer and gas in the enclosing chamber in close conjunction with the physical expansion of the liquid polymer material and while the compressible liquid polymer material and gas are in a physical condition to yield readily to the introduction of said solid particles, said particle material being selected to add particular structural and/or chemical properties to the composition material as finally produced, controlling the quantity of introduced added particle material, in any amount up to a limit determined by the amount of compressibility of the gas expanded liquid polymer material within the enclosing chamber, to cause all of the added particle material to be intimately and evenly distributed within the polymer material while the polymer material is expanded in a relaxed state in the enclosing chamber wherein substantially every particle of the added particle material is fully encapsulated by a membrane of the polymer material as the mixture of the expanded polymer material, gas and added particle material flows through and out of the enclosing chamber, conveying the mixture in a relaxed, fluid, flowable state from the outlet of the enclosing chamber to a zone of application, and completing sufficient curing of the polymer material to hold the added particle material substantially uniformly distributed within and embedded within a matrix of the polymer material at the zone of application whereby said matrix enables the composition material substantially uniformly to incorporate particular structural and/or chemical properties of the added particle material.

2. The method defined in claim 1 wherein the polymer material conducted to the mixing chamber is a polymer emulsion compound having water in the emulsion.

3. The method defined in claim 1 wherein the added solid material is sand and the cured polymer and particle composite material has a thickness of about ¼ inch.

4. The method defined in claim 2 wherein a polymer emulsion is an asphaltic material.

5. The method defined in claim 1 wherein the polymer material is a solvent diluted polymer.

6. The method defined in claim 5 wherein the solvent in the diluted polymer is a volatile organic compound.

7. The method defined in claim 1 wherein the polymer material conducted to the mixing chamber is a chemically cross-linking polymer material.

8. The method defined in claim 1 wherein the added solid material is a sand filler and chopped fiberglass.

9. The method defined in claim 8 wherein the sand filler is added in an amount which provides high compressive strength to the composition material and which enhances the capacity of the composition material product to accept physical abuse, as compared to the polymer material alone without the sand.

10. The method defined in claim 8 wherein the dry, chopped fiberglass is added in an amount which adds tensile strength to the composition material product.

11. The method defined in claim 8 wherein the sand filler was added in an amount to produce a composition material product having a density of approximately 95 to 97 pounds per cubic foot.

12. The method defined in claim 1 wherein the added solid material has a mesh size small enough to resist conveyance due to packing when conveyed by a gravity feed pressurized conveyance system and including the step of adding the solid particle material using a fluidized bed chamber to suspend and to convey the solid particle material.

13. The method defined in claim 12 wherein the added solid particle material is bentonite clay having a particle size smaller than 100 mesh particle size.

14. The method defined in claim 1 wherein the added solid material is bentonite clay of approximately 30 mesh particle size added in an amount to provide waterproofing properties in the produced composition material product.

15. The method defined in claim 1 wherein the added solid material is bentonite clay of approximately 17 mesh particle size and the produced composite material has a thickness of about ¼ inch.

16. The method defined in claim 1 wherein the polymer material is a coal tar chemically cross-linking polyurethane that provides chemical resistance to hydrocarbon exposure.

17. The method defined in claim 1 wherein the added solid material is ground rubber added in an amount to provide cushioning in the composition material product.

18. The method defined in claim 1 wherein the inert gas is carbon dioxide.

19. The method defined in claim 1 wherein the inert gas is carbon dioxide supplied to the enclosing chamber through a line having an internal diameter of about 3/32 inch at a pressure of approximately 900 pounds per square inch in the line and wherein the carbon dioxide gas was introduced into the mixing chamber in a range at a rate of about 0.025 to 0.05 per cent by volume of the mixing chamber.

20. The method defined in claim 19 wherein the enclosing chamber is a ¾ fitting and the mixing chamber has an internal diameter of about ¼ inch.

21. The method defined in claim 20 wherein the mixing chamber includes a polymer mixer having internal helical vanes for mixing the liquid polymer components together followed by an inert gas mixer for intimately blending the pressurized inert gas within the liquid polymer material.

22. The method defined in claim 21 wherein the inert gas mixer includes a spiral configured metal brush which fits snugly within the internal diameter of the inert gas mixer.

23. The method defined in claim 1 wherein a material regulator valve is interposed between the mixing chamber and the enclosing chamber and wherein the material regulator valve restricts the flow sufficiently to cause the material entering the enclosing chamber to undergo a substantial pressure drop.

24. The method defined in claim 1 including the step of intimately blending the gas with the polymer material.

25. The method defined in claim 1 wherein the material flowing from the enclosing chamber is poured at the zone of application.

26. The method defined in claim 1 wherein the material flowing from the enclosing chamber is sprayed onto the zone of application.

27. The method defined in claim 1 wherein the solid particle material is conducted in an air stream and is introduced into the enclosing chamber very close to the zone of application so as to make possible the conveyance of very viscous, mortar consistency, mixed composition material in a very controllable way and without abrasive wear to liquid polymer pumps.

\* \* \* \* \*